United States Patent Office.

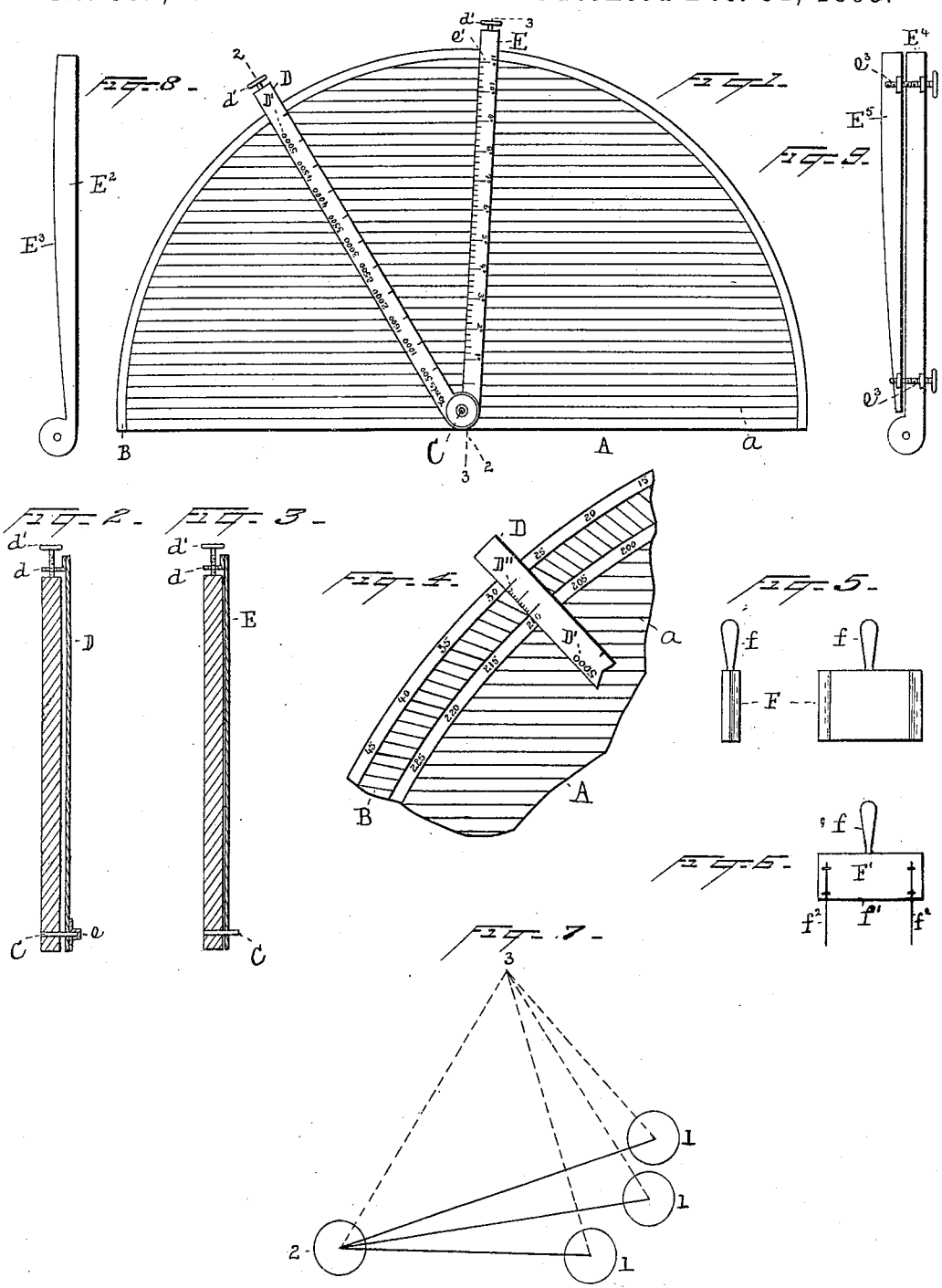

WILLIAM C. RAFFERTY, OF GOVERNOR'S ISLAND, NEW YORK.

DEVICE FOR DETERMINING LOCATIONS OF DISTANT OBJECTS.

SPECIFICATION forming part of Letters Patent No. 552,261, dated December 31, 1895.

Application filed May 19, 1894. Serial No. 511,796. (No model.)

*To all whom it may concern:*

Be it known that I, WILLIAM C. RAFFERTY, a citizen of the United States, residing at Governor's Island, in the State of New York, have invented a certain new and useful Improvement in Devices for Determining the Location of a Distant Object, of which the following is a specification.

This invention comprises mechanism for mechanically determining, from one point by reference to a second point the location of which by polar co-ordinates is known, the distance and azimuth of a third point relatively to said first point. Thus, for illustration, let one of the angles A of a triangle A B C (not shown) represent the first point, the base of said triangle being A B. By any suitable means the distance and azimuth or the polar co-ordinates of C the third point relatively to B the second point, is ascertained. At A is located the device contemplated in this invention, and by its operation, based upon the calculation of distance and azimuth of B to C, the point C is accurately determined relatively to A.

There are many connections in which the invention may be advantageously employed. The particular embodiment illustrated in the drawings and hereinafter described has, however, been designed for use in connection with gunnery or a battery or batteries of guns. As will be readily understood, it is oftentimes desirable to train a gun upon an object which is hidden from observation at the point of location of the gun. A range-finder at this point would, of course, be useless. A location-determining device of any suitable kind may, however, be placed at a third point where the view is uninterrupted and the distance and azimuth of the object to be fired upon, relatively to that point, calculated and transmitted to the gun or battery. By means of such calculation and the device of this invention the gun or guns of the battery or batteries may then be trained upon the object with great accuracy.

In the drawings, Figure 1 is a plan view of the invention. Fig. 2 is a section on the line 2 2 of Fig. 1. Fig. 3 is a section on the line 3 3 of Fig. 1. Fig. 4 is an enlarged detail view of a portion of the board and one of the arms shown in Fig. 1. Fig. 5 shows in side and end elevation a spacing-piece, by means of which the position of the arms relatively to each other is regulated. Fig. 6 is a modification of said spacing-piece. Fig. 7 is a diagrammatic view hereinafter to be referred to, and Figs. 8 and 9 are enlarged detail views illustrating modifications of one of the arms shown in Fig. 1.

Referring to the drawings, in which similar letters of reference indicate corresponding parts, A designates a flat base or board of metal or other suitable material and approximately semicircular, as shown. In practice its periphery will measure a little more than one hundred and eighty degrees. The upper surface of this board is finely divided into parallel lines $a$ in any suitable manner. For instance, the board may be provided with closely-adjacent grooves or rods, or the lines may be marked or impressed thereon as desired. Extending around the upper surface of the board A, adjacent to the periphery thereof, is a circular graduation B, a portion of which, enlarged, is shown in Fig. 4. This graduation is so constructed and divided as to indicate the degrees and parts of degrees relatively to the center of the board. I have herein shown a diagonal vernier for reading the angle to a small part of a degree. By a numbering inside and outside of the vernier the degrees are indicated consecutively from zero to three hundred and sixty degrees.

The inner and outer numbers upon the scale, as shown in Fig. 4, are on radial lines, though such lines need not be visible and are not illustrated upon the drawings. The diagonal lines only are used, and, therefore, the radial lines are omitted. These diagonal lines form, with the edge of arm D or E, a diagonal vernier. The numbers generally increase from left to right.

C designates a pivot secured to the center of the board A. Upon this pivot is mounted, by means of a sleeve $e$, one end of the radial arm D, which extends across the surface of the board A and projects a short distance beyond the periphery thereof. At its free end the arm D is provided with a rearwardly-extending projection $d$, through which may pass a screw $d'$ of any suitable construction, the office of which is to bind upon the periphery of the board A and thereby secure the arm D in any position in which it may be placed.

The edge of the arm D is graduated, as shown at D', the lines of division being preferably accompanied by numerals increasing in proportion of distance from the central point, which is the pivot C. At that point, upon the arm directly over the scale B, the arm D is provided with a further graduation D'', designed to be used in connection with the divisions upon said circular graduation. By this means a reading may be had to one minute of an arc, or even to less if desired.

E designates a radial arm similar in many respects to the arm D and mounted upon the same pivot C. It is designed, by means of the construction described, to so mount the arms that the movement of one will be entirely independent of that of the other. The free end of the arm E may be provided with a clamping device similar to that employed in connection with the arm D. The arm E is also graduated upon its upper surface, as at e'. The divisions of this graduation may, like those of the arm D, be numbered in proportion to the distance from the central point or pivot C, and also, like said arm D, this graduation may be used for the determination of distance. In the present embodiment of the invention, however, in which the device is described in its application to the aiming of guns, the graduation of the arm E will indicate the elevation necessary to be given to the gun in directing the projectile toward a certain point.

F designates a spacing-piece having a handle f. This piece may be made of metal or other suitable material, and in practice its opposite edges are sharp, as shown in Fig. 5. The length of this spacing-piece is determined by calculation, based upon the graduation or scale of the arm D, of the distance between the gun in connection with which the device is used and the point of location of the range-finder or other apparatus by means of which the position of the object to be fired upon is ascertained.

In Fig. 6 is illustrated at F' a modification of the spacing-piece F. In this instance the body f' is provided with two downwardly-projecting needles f², adapted to be placed upon the board A in the same manner as that in which the piece F is used.

Turning to the diagram illustrated in Fig. 7, it will be seen that there are several triangles having one side in common. This side is the line between the point of location of the range-finder or other position-ascertaining device 2 and the object 3 to be fired upon, the latter corresponding with the pivotal point C on the board. To premise, it should be understood that if from the center of one of the circles 1, Fig. 7, a radius be drawn parallel to 2 3 it will have the same azimuthal reading on the circle of 1 as 2 3 has on the circle of 2. If from any point on this line a straight line be drawn parallel to 1 2 and the line 1 3 be drawn, a triangle will be formed inside the circle 1, similar in all respects to the triangle 1 2 3, but on a reduced scale. This will make more clear the principle of operation of this device. The line drawn parallel to 2 3 corresponds in this instance to the arm E. The line parallel to 1 2 corresponds to the spacing-piece, and the line 1 3 corresponds to the arm D. The distance and azimuth of 3 from 2 may be ascertained in any suitable manner. The distance and azimuth of the guns 1 relatively to the point 2 will usually be unvarying and known. It will be understood that the azimuth is generally measured from the "south" point around to the west. The reading thus obtained at both points 2 and 1 is that given on the circular scale B at the point where one of the parallel lines, passing through the pivot or center C of the board A, intersects it. It now remains to determine from each of the guns 1 the position of the object 3 relatively thereto. A description of the operation of a single one of the several position-determining devices will be sufficient, it being understood that one of said devices is connected with each of the guns designated by a circle in this figure.

The location of the object 3 relatively to the range-finder 2 is transmitted to the officer or other attendant at the gun. The circular scale B is so constructed as that the division which passes through the pivot C indicates upon the said scale B the azimuth of the gun relatively to the range-finder or of the range-finder relatively to the gun. Of course the azimuth of a line is the reading on the horizon reckoned from the south point to the point of intersection of the line and horizon. Such a line, if continued, would obviously intersect the horizon at two points, and these would be one hundred and eighty degrees apart. The arm E is then turned to a position upon the board determined by the graduating media and representing the azimuth of the object 3 as seen at 2. The spacing-piece F is then placed upon the board A in or parallel to one of the grooves a thereon or on or parallel to one of the lines marked upon said board, one end of said piece F being placed against the edge of the arm E opposite that mark of the scale thereon indicating the distance from the object 3 to the range-finder 2. The arm D is then moved upon its center until it touches the other end of the spacing-piece F. The reading of the circular vernier at the edge of the arm D will then indicate the azimuth of the object 3 relatively to the gun 1, and the reading of the scale on the arm D at the edge of the spacing-piece F will indicate the distance between the gun and said object 3.

As is well known, the direction of flight of a projectile is often influenced to a considerable extent by the motion imparted to it through the "rifling" or grooving of the gun from which it is impelled, as well as by the action of the wind, either of which causes may operate to divert the projectile from a straight line between the gun and the object fired upon. I have provided for this contingency in the manner illustrated in Figs. 8 and 9, which show modifications of the arm E heretofore described. Referring first to the former, it will be seen that the edge $E^3$ of the arm $E^2$ is curved outwardly. This curve will, of course, be very slight and will cause such a reading of the circular vernier at the edge of the arm as will compensate for the deflection of the projectile through any cause.

In Fig. 9 is illustrated a construction by means of which the advantages of both forms of the arm are combined. In this construction the arm is made in two parts, one part $E^4$ being similar to the arm E heretofore described, and the part $E^5$ being similar to the arm $E^2$ above referred to. These two parts may be maintained in proper position relatively to each other by any suitable means. I have, however, shown for that purpose screws $e^3$ mounted upon the part $E^4$ and engaging with a stud or projection upon the part $E^5$. Both of these parts may be carried by the same sleeve, which is mounted upon the pivot C, or the part $E^5$ may be supported entirely by the screws $e^3$, as shown. It will be understood that the curve of the edge of the arm $E^2$ or that of the part $E^5$ may be varied in degree and that such curves, instead of extending outwardly, may extend inwardly, according as the varying conditions may necessitate a deviation in the training of a gun.

What I claim, and desire to secure by Letters Patent, is—

1. A device for determining the location of a distant object by polar co-ordinates, comprising a base provided with straight, parallel lines or grooves and an azimuthal scale or graduation adjacent to the periphery of said base, a pivot in said base, and arms mounted thereon, means for limiting the movement of said arms relatively to each other, one of said lines or grooves coinciding with said pivot and intersecting said scale or graduation and indicating at the point of intersection the azimuth of an established base line of a triangle, substantially as set forth.

2. A device for determining the location of a distant point, comprising a base having an azimuthal scale or graduation, the surface of said base being provided with parallel, straight grooves or lines, pivotally mounted arms operating upon said base, and means adapted to be placed between said arms for limiting their movement relatively to each other, substantially as set forth.

3. A device for determining the location of a distant point, comprising a base having an azimuthal graduation, arms pivotally mounted upon said base and having scales or graduations, and a spacing-piece independent of said arms and adapted to be placed between them, substantially as set forth.

4. A device for determining the location of a distant object, comprising a semi-circular board having a diagonal graduation near its periphery, pivotally mounted arms having graduations or scales and verniers for use in connection with said diagonal graduation upon the board, and a spacing-piece, substantially as set forth.

5. A device for determining the location of a distant point, comprising a board, two arms mounted upon a pivot secured thereto and having scales or graduations, and a spacing-piece having sharp edges and adapted to be placed between said arms to indicate the point upon the arms where a reading is to be taken, substantially as set forth.

6. In a device for determining the location of a distant object by polar co-ordinates, a base provided with parallel, straight divisions and having a curved scale or graduation in azimuth about a pivot, the datum point of said scale being that point where the straight division through said pivot intersects it, and this datum being the azimuth of an established base line of a triangle, substantially as set forth.

7. A base for use in connection with a device for determining the location of a distant object, said base having a diagonal scale or graduation indicating the degrees of a circle in azimuth, and an arm operating in conjunction with said board and having a vernier indicating the parts of a degree upon said scale or graduation, substantially as set forth.

8. A device for determining the location of a distant object, comprising a base, two arms mounted upon a common center, a separate and independent spacing-piece for limiting the movement of said arms toward each other, and parallel guides upon said base for determining the position of said spacing-piece, substantially as set forth.

9. A device for determining the location of a distant object, comprising a base, two arms pivotally mounted upon a common center, means for clamping said arms in any position upon said base, a separate and independent spacing-piece, and means upon said base for guiding the same, substantially as set forth.

10. A device for determining the location of a distant object, comprising a base, two arms mounted thereon, one of which is provided with a curved edge, and a spacing-piece for limiting the movement of said arms toward each other, substantially as set forth.

11. A device for determining the location of a distant object, comprising a board having parallel, straight divisions and an azimuthal graduation, two arms mounted upon a common pivot upon said board and representing two of the sides of a triangle, the apex of which is the object, one of said arms having a scale or graduation indicating the distance of the object relatively to a third point, and the other having a scale or graduation indicating the distance from the object to the device, and a spacing-piece representing the base of the triangle and determining the movement of the latter arm toward the former, substantially as set forth.

12. A device for determining the distance and azimuth of an object, comprising a base having parallel, straight divisions and a circular scale or azimuthal graduation near its curved periphery, said scale or graduation being numbered from any point through a range of three hundred and sixty degrees, giving to the parallel divisions the azimuth of that division which passes through the center, arms pivotally mounted upon said center, and a spacing-piece adapted to be placed upon said board, parallel with said divisions, for determining the movement of said arms relatively to each other, substantially as set forth.

This specification signed and witnessed this 16th day of May, 1894.

WILLIAM C. RAFFERTY.

Witnesses:
S. O. EDMONDS,
JOHN R. TAYLOR.